United States Patent
Florkey et al.

(10) Patent No.: US 7,398,294 B2
(45) Date of Patent: *Jul. 8, 2008

(54) APPLICATION SERVER COMPONENT THAT NOTIFIES ONE OR MORE COMMUNICATION DEVICES OF ONE OR MORE INVITATIONS TO JOIN COMMUNICATION SESSION

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 868 days.

This patent is subject to a terminal disclaimer.

(21) Appl. No.: 10/601,249

(22) Filed: Jun. 20, 2003

(65) Prior Publication Data

US 2005/0015495 A1    Jan. 20, 2005

(51) Int. Cl.
G06F 13/00    (2006.01)
(52) U.S. Cl. .................. 709/204; 709/227; 715/753; 370/261
(58) Field of Classification Search ......... 709/204–206, 709/227, 229; 715/751–759; 370/260, 261; 379/900
See application file for complete search history.

(56) References Cited

U.S. PATENT DOCUMENTS

| | | | | |
|---|---|---|---|---|
| 6,343,313 | B1 * | 1/2002 | Salesky et al. | 709/204 |
| 6,499,053 | B1 * | 12/2002 | Marquette et al. | 709/204 |
| 6,564,261 | B1 * | 5/2003 | Gudjonsson et al. | 709/227 |
| 6,608,636 | B1 * | 8/2003 | Roseman | 715/753 |
| 7,308,090 | B2 * | 12/2007 | White et al. | 379/202.01 |
| 2002/0073150 | A1 * | 6/2002 | Wilcock | 709/204 |
| 2003/0115153 | A1 * | 6/2003 | Li et al. | 705/67 |
| 2003/0220980 | A1 * | 11/2003 | Crane | 709/207 |
| 2005/0078612 | A1 * | 4/2005 | Lang | 370/260 |
| 2006/0085823 | A1 * | 4/2006 | Bell et al. | 725/81 |

FOREIGN PATENT DOCUMENTS

WO    WO 2004073288 A2 *    8/2004

OTHER PUBLICATIONS

Miladinovic et al.; Multiparty Conference Signalling Using the Session Initiation Protocol (SIP); Proceedings of the Inc 2002; pp. 191-198; Jul. 2002.*

* cited by examiner

Primary Examiner—Kenneth R. Coulter

(57) ABSTRACT

An application server component of an apparatus in one example receives an indication of one or more communication devices that are to receive one or more invitations to join a communication session. The application server component notifies the one or more communication devices of the one or more invitations to join the communication session. Upon acceptance of one or more of the one or more invitations by one or more of the one or more communication devices, the application server component connects the one or more of the one or more communication devices to the communication session.

24 Claims, 3 Drawing Sheets

APPLICATION SERVER COMPONENT THAT NOTIFIES ONE OR MORE COMMUNICATION DEVICES OF ONE OR MORE INVITATIONS TO JOIN COMMUNICATION SESSION

CROSS-REFERENCE TO RELATED APPLICATION

This application contains subject matter which is related to the subject matter of the following patent, which is assigned to the same assignee as this application. The below listed patent is hereby incorporated herein by reference in its entirety:

"APPLICATION SERVER COMPONENT NOTIFICATION TO ONE OR MORE COMMUNICATION DEVICES OF ONE OF MORE OPEN COMMUNICATION SESSIONS," by Florkey, et al., U.S. Pat. No. 7,171,228, issued Jan. 30, 2007.

TECHNICAL FIELD

The invention relates generally to communications and more particularly to communication session invitations.

BACKGROUND

Users of communication devices desire to have the ability to conduct communication sessions that involve a plurality of communication devices. The communication devices in one example comprise mobile phones, telephonic devices, and computers. The communication session in one example comprises a conference call. A first communication device in one example places a call to a second communication device. A call control component connects the first communication device to the second communication device. In one example, if a user of the second communication device answers the call, then the user of the second communication device enters into a conversation with a user of the first communication device.

In another example, if the user of the second communication device is not available to answer the call, then the user of the first communication device accesses a voice mail account of the second communication device. For example, the user of the first communication device leaves a voice message that asks the user of the second communication device to return the call at a later time. The user of the second communication device employs a communication device to access the voice mail account. The voice message of the voice mail account indicates that the user of the first communication device has requested that the user of the second communication device to return the call. The user of the second communication device may then call a phone number of the first communication device to talk to the user of the first communication device.

As one shortcoming, the user of the second communication device is unaware of a request to return the call until the user of the second communication device checks the voice message. The user of the second communication device in one example may check the voice message once it is too late to return the call, for example, after the call has ended. As another shortcoming, it may take the user of the second communication device a long time to check the voice message and dial the phone number of the first communication device.

Thus, a need exists for a system that promotes an ease for a communication device to join a communication session after receipt of an invitation to join the communication session.

SUMMARY

The invention in one embodiment encompasses an apparatus. The apparatus comprises an application server component that receives an indication of one or more communication devices that are to receive one or more invitations to join a communication session. The application server component notifies the one or more communication devices of the one or more invitations to join the communication session. Upon acceptance of one or more of the one or more invitations by one or more of the one or more communication devices, the application server component connects the one or more of the one or more communication devices to the communication session.

Another embodiment of the invention encompasses a method. An indication of one or more first communication devices that are to receive one or more invitations to join a communication session with one or more second communication devices is received by an application server component. One or more indicators of the one or more invitations to join the communication session are activated on the one or more first communication devices. An acceptance of one or more of the one or more invitations by one or more of the one or more first communication devices is received at the application server component. The one or more of the one or more first communication devices are connected to the communication session.

Yet another embodiment of the invention encompasses an article. The article comprises one or more computer-readable media. The article comprises means in the computer-readable medium for receiving an indication of one or more first communication devices that are to receive one or more invitations to join a communication session with one or more second communication devices. The article comprises means in the computer-readable medium for activating one or more indicators of the one or more invitations to join the communication session on the one or more first communication devices. The article comprises means in the computer-readable medium for receiving an acceptance of one or more of the one or more invitations by one or more of the one or more first communication devices. The article comprises means in the computer-readable medium for connecting the one or more of the one or more first communication devices to the communication session.

DESCRIPTION OF THE DRAWINGS

Features of exemplary implementations of the invention will become apparent from the description, the claims, and the accompanying drawings in which:

DETAILED DESCRIPTION

Figure 1:
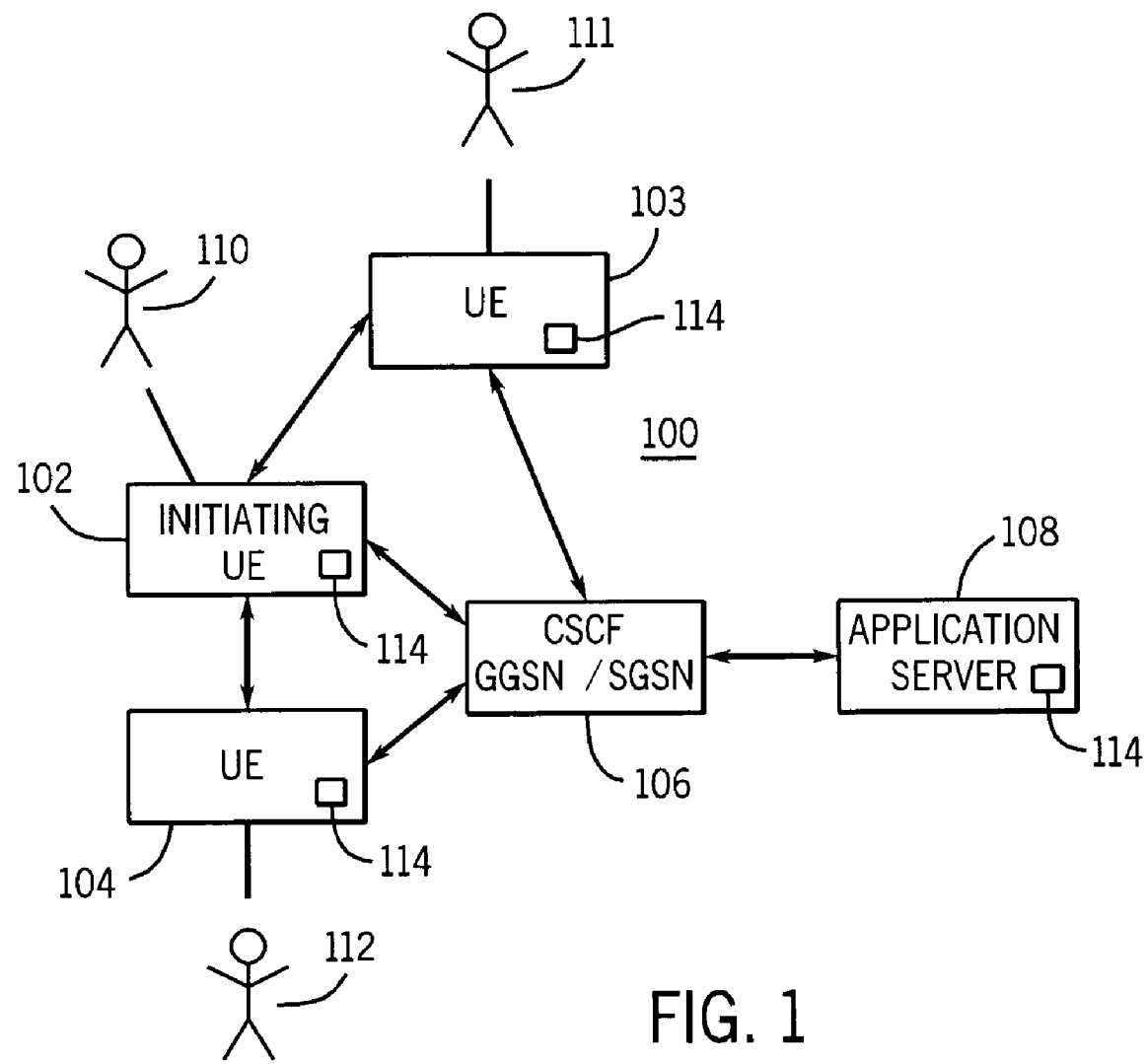
FIG. 1 is a representation of an exemplary implementation of an apparatus that comprises one or more communication devices, one or more call control functions, and one or more application server components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more communication devices 102, 103, and 104, one or more control components 106, and one or more application server components 108. The apparatus 100 in one example comprises a telecommunications and/or computer network. One or more users 110, 111, and 112 employ the one or more communication devices 102, 103, and 104 for communication. For example, the user 110 employs the communication device 102 to begin a communication session with one or more of the users 111 and 112 of the communication devices 103 and 104.

The communication session in one example comprises a data session or a voice conference call. For example, the users 110, 111, and 112 employ one or more of the communication devices 102, 103, and 104 to communicate in the communication session. The communication devices 102, 103, and 104 in one example comprise one or more of a telephonic device, a mobile phone, a personal digital assistant, and a computer. For example, one or more of the communication devices 102, 103, and 104 comprise user equipment ("UE"). The communication device 102 in one example comprises initiating user equipment of one or more invitations for a user 112 of a communication device 104 to join the communication session. The communication devices 102, 103, and 104 in one example comprise an instance of the recordable data storage medium 114.

The users 110 and 111 of the communication devices 102 and 103 in one example communicate in a communication session. One or more of the users 110 and 111 desire to include the user 112 of the communication device 104 in the communication session. The communication device 102 in one example sends to the application server component 108 an indication of the communication device 104 that is to receive an invitation to join the communication session. The indication in one example comprises a phone number, an email address, or an instant message account name of the communication device 104 and/or the user 112. The application server component 108 sends an invitation to join the communication session to the communication device 104. The invitation in one example comprises one or more of a phone call, a photo, and a short message service ("SMS") message. The invitation activates one or more indicators of the invitation on the communication device 104. The indicators in one example comprise one or more of an icon, a tone, and a light. The indicators in one example serve to represent a standing invitation for the communication device 104 to join the communication session. For example, the indicators persist until the communication device 104 and/or the user 112 respond to the application server 108.

In one example, the communication device 104 responds to the application server component 108 with an acceptance of the invitation to join the communication session. The acceptance in one example comprises an employment of the one or more indicators by the communication device 104. For example, the user 112 employs the communication device 104 to push a button, select a menu item, enter a voice command, or enter an SMS message to accept the invitation. The application server component 108 sends a session identification of the communication session to the control component 106. The session identification in one example comprises one or more of a telephone number and an IP address of the communication session. The control component 106 connects the communication device 104 with the communication devices 102 and 103 in the communication session.

In another example, the communication device 104 responds to the application server component 108 with a rejection of the invitation to join the communication session. For example, the user 112 does not desire to enter the communication session with the users 110 and 111. The application server component 108 in one example may connect the communication device 104 to a message service of one or more of the communication devices 102 and 103. For example, the communication device 104 sends a notification to the one or more of the communication devices 102 and 103 that the user 112 will not join the communication session. The notification in one example comprises one or more of a voice message, an email, a fax, an SMS message, and an instant message.

In yet another example, one or more of the communication devices 102 and 103 send a withdrawal of the invitation to the application server component 108 prior to a response by the communication device 104. For example, the communication session may come to a completion or the user 112 is no longer invited to join the communication session. The application server component 108 in one example may connect the one or more of the communication devices 102 and 103 to a message service of the communication device 104. For example, the one or more of the communication devices 102 and 103 send one or more notifications to the application server component 108 that the invitation has been withdrawn. The notifications in one example comprise one or more of a voice message, an email, a fax, an SMS message, and an instant message.

The users 110, 111, and 112 employ the communication devices 102, 103, and 104 to send one or more of the indications, the invitations, the withdrawals, and the notifications. In one example, the users 110, 111, and 112 employ a hard button to send the one or more of the indications, the invitations, the withdrawals, and the notifications. The hard button in one example comprises one or more of an alpha-numeric keypad and a keyboard. In another example, the users 110, 111, and 112 employ a soft button to send the one or more of the indications, the invitations, the withdrawals, and the notifications. The soft button in one example comprises one or more of an icon, a touch-screen, and an indicator. In yet another example, the users 110, 111, and 112 employ a voice command to send one or more of the indications, the invitations, the withdrawals, and the notifications.

The control component 106 in one example transfers one or more of the withdrawals, the indications, the invitations, the notifications, the acceptances, and the rejections between one or more of the communication devices 102, 103 and 104 and the application server component 108. For example, upon receipt of one or more of the acceptances, the withdrawals, and the rejections of the invitations by the application server component 108, the control component 106 in one example sends one or more of the notifications to one or more of the communication devices 102, 103, and 104. The control component 106 in one example connects one or more of the communication devices 102, 103, and 104 to a communication session. The control component 106 creates and/or stores a session identification of the communication session. For example, the control component 106 employs the session identification to connect the one or more of the communication devices 102, 103, and 104 to the communication session.

The control component 106 in one example comprises a call state control function ("CSCF"). In one example, where one or more of the communication devices 102, 103, and 104 comprise one or more of a personal digital assistant and a computer, the control component 106 comprises one or more of a gateway general packet radio service support node ("GGSN") and a serving general packet radio service support node ("SGSN"). In another example, where one or more of the communication devices 102, 103, and 104 comprise one or more of a telephonic device and a mobile phone, the control component 106 comprises one or more switch functions. In one example, the control component 106 and the application server component 108 are separate components. In another example, the control component 106 and the application server component 108 are the same component.

The application server component 108 in one example transfers one or more of the withdrawals, the indications, the invitations, the notifications, the acceptances, and the rejections between the communication devices 102, 103, and 104 and the control component 106. For example, prior to an acceptance, a withdrawal, or a rejection of the invitation by one or more of the communication devices 102, 103, and 104, the indicators alert the user 112 of an invitation to join a communication session. Upon one or more of the acceptance, the withdrawal, the rejection, the completion of the communication session, the application server component 108 removes the indicator from the communication device 104.

Upon the one or more of the acceptance, the withdrawal, the rejection, and the completion of the communication session, the application server component 108 in one example sends one or more notifications to one or more of the control component 106 and the communication devices 102, 103, and 104. Upon the rejection, the application server component 108 sends the one or more notifications to one or more of the communication devices 102 and 103. Upon one or more of the withdrawal and the completion of the communication session, the application server component 108 sends one or more notifications to the communication devices 104.

Upon the acceptance of the one or more invitations, the application server component 108 sends one or more notifications to one or more of the communication devices 102 and 103. For example, the application server component 108 matches the acceptance with the source of the indication of the invitations to determine a session identification of the communication session. The source in one example comprises the one or more of the communication devices 102 and 103. The application server component 108 sends the session identification to the control component 106. The control component 106 connects the communication device 104 with the communication session of the communication devices 102 and 103.

The application server component 108 in one example stores information of one or more of the communication session and the communication devices 102, 103, and 104. For example, the application server component 108 stores one or more of the session identification, the indications of the communication devices 104, a service subscription field, a timer, a subject of the communication session, and a communication device type. The application server component 108 in one example employs the service subscription field to determine the eligibility of the communication devices 102, 103, and 104 to utilize standing invitations. The application server component 108 in one example employs the timer to alert the communication device 104 of the length of the communication session. The application server component 108 in one example employs the subject to alert the communication device 104 of the topic of the communication session. The application server component 108 in one example employs the communication device type to convert between text and speech for one or more of the communication devices 102, 103, and 104. The application server component 108 in one example comprise an instance of the recordable data storage medium 114.

Figure 2:
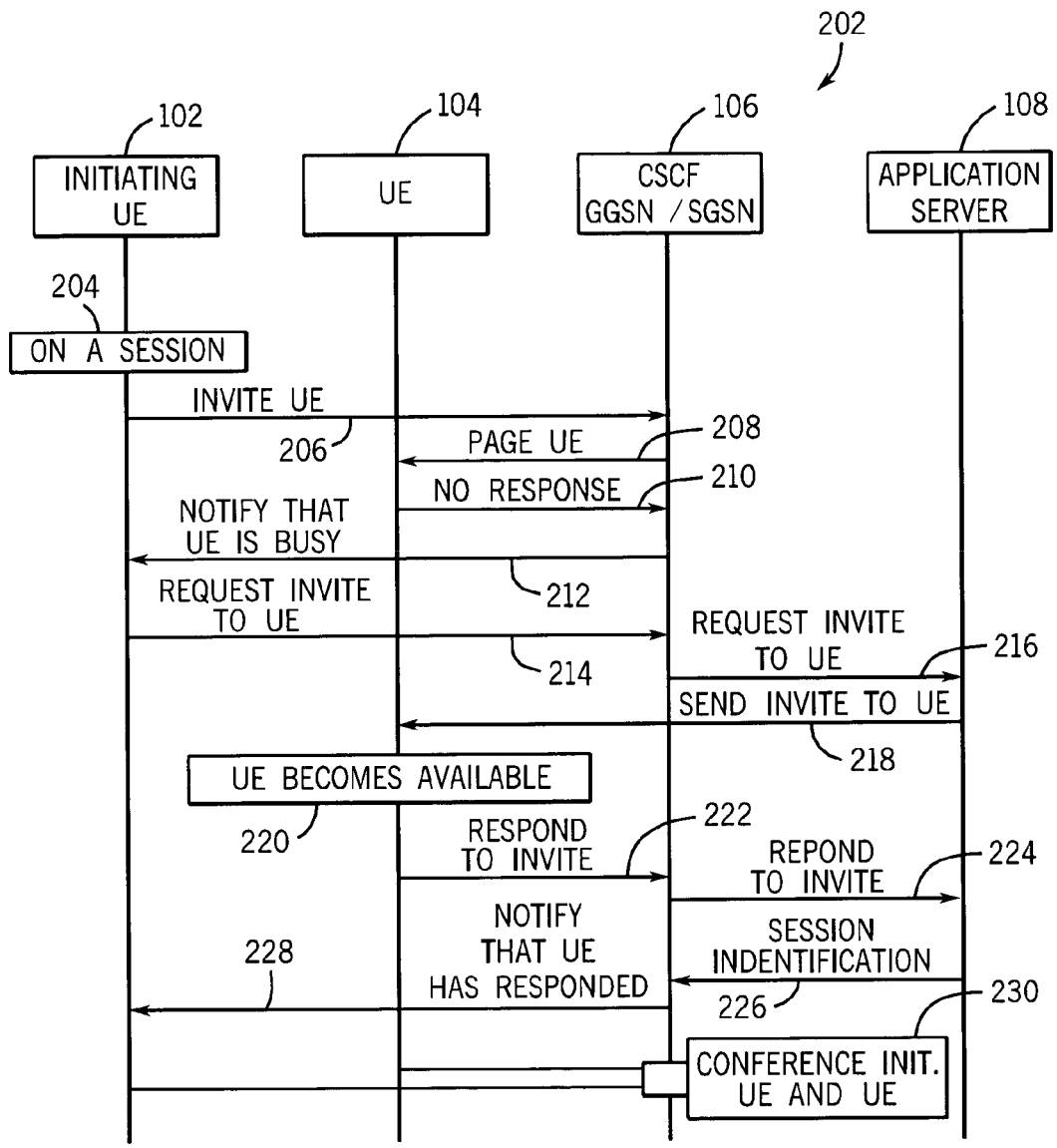
FIG. 2 is a representation of an exemplary implementation of a message flow illustrating an employment of invitations, acceptances, and rejections of a communication session by the application server component of FIG. 1.

Referring to FIGS. 1 and 2, an illustrative description of exemplary operation of the apparatus 100 is now presented, for explanatory purposes. Message flow 202 represents an exemplary employment of invitations, acceptances, and rejections of a communication session by the application server component 108. For example, the application server component 108 activates one or more indicators of the invitations to join a communication session to the communication device 104. The communication device 104 sends the acceptance of the invitation to the application server component 108. The application server component 108 connects the communication device 104 to the communication session.

The communication devices 102 and 103 connect through a communication session 204. "ON A SESSION" in one example serves to represent the communication session 204. The users 110 and 111 of the communication devices 102 and 103 may invite another user 112 to join the communication session 204. "INVITE UE" in one example serves to represent a phone call 206 to the communication device 104 from the communication device 102. "UE" in one example serves to represent one or more of the communication devices 102, 104, and 106.

Upon receipt of the phone call 206, the control component 106 attempts to contact the communication device 104. "PAGE UE" in one example serves to represent a phone call 208 to the communication device 104. Upon receipt of the phone call 208, the communication device 104 does not respond to the attempt at contact. "NO RESPONSE" in one example serves to represent an indication of a non-response 210 by the communication device 104. Upon receipt of the indication of the non-response 210, the control component 106 sends a notification 212 to the communication device 102. "NOTIFY THAT UE IS BUSY" in one example serves to represent the notification 212 to alert the user 110 that the communication device 104 is not available.

Upon receipt of the notification 212, one or more of the communication devices 102 and 103 may still want to invite the communication device 104 to join the communication session 204. "REQUEST INVITE TO UE" in one example serves to represent an indication 214 of an invitation for the communication device 204 to join the communication session. Upon receipt of the indication 214, the control component 106 sends an indication 216 to the application server component 108. "REQUEST INVITE TO UE" in one example serves to represent the indication 216 of the invitation.

Upon receipt of the indication 216, the application server component 108 sends an activation 218 of the invitation to the communication device 104. "SEND INVITE TO UE" in one example serves to represent the activation 218 of the invitation. For example, the invitation causes the activation 218 of an indicator. The indicator in one example comprises an icon. Upon receipt of the indicator 218, the icon in one example alerts the communication device 104 of the communication session with the users 110 and 111. Upon receipt of the indicator of the invitation, the one or more of the communication devices 102, 103, and 104 take an action. The action comprises one or more of an acceptance of an invitation, a rejection of an invitation, a withdrawal of an invitation, and a completion of the communication session.

In one example, upon availability 220 of the user 112, the user 112 notices the icon. "UE BECOMES AVAILABLE" in one example serves to represent the availability 220 of the user 112. Upon the availability 220 of the user 112, the user may send a response 222 of the invitation to the control component 106. For example, the response 222 comprises the action that occurs when the user 112 selects the icon. In one example "RESPOND TO INVITE" serves to represent an acceptance of the invitation. In another example, "RESPOND TO INVITE" serves to represent a rejection of the invitation. Upon receipt of the response 222, the control component 106 sends a response 224 to the application server component 108.

Upon the receipt of the response 224, the application server component 108 makes a match between a source of the invitation with the response 224 to the invitations. For example, the source comprises the communication device 102. The match determines a session identification 226 of the communication session. "SESSION IDENTIFICATION" in one example serves to represent the session identification 226 of the communication session. Upon receipt of the session identification 226, the control component 106 sends a notification 228 of the response 224 to the communication device 102. "NOTIFY THAT UE HAS RESPONDED" in one example serves to represent the notification 228. Where the response in one example represents the acceptance, upon receipt of the session identification from the application server component 108, the control component connects the communication device 104 to a communication session 230. "CONF. INIT. UE and UE" in one example serves to represent the communication session 230

Figure 3:
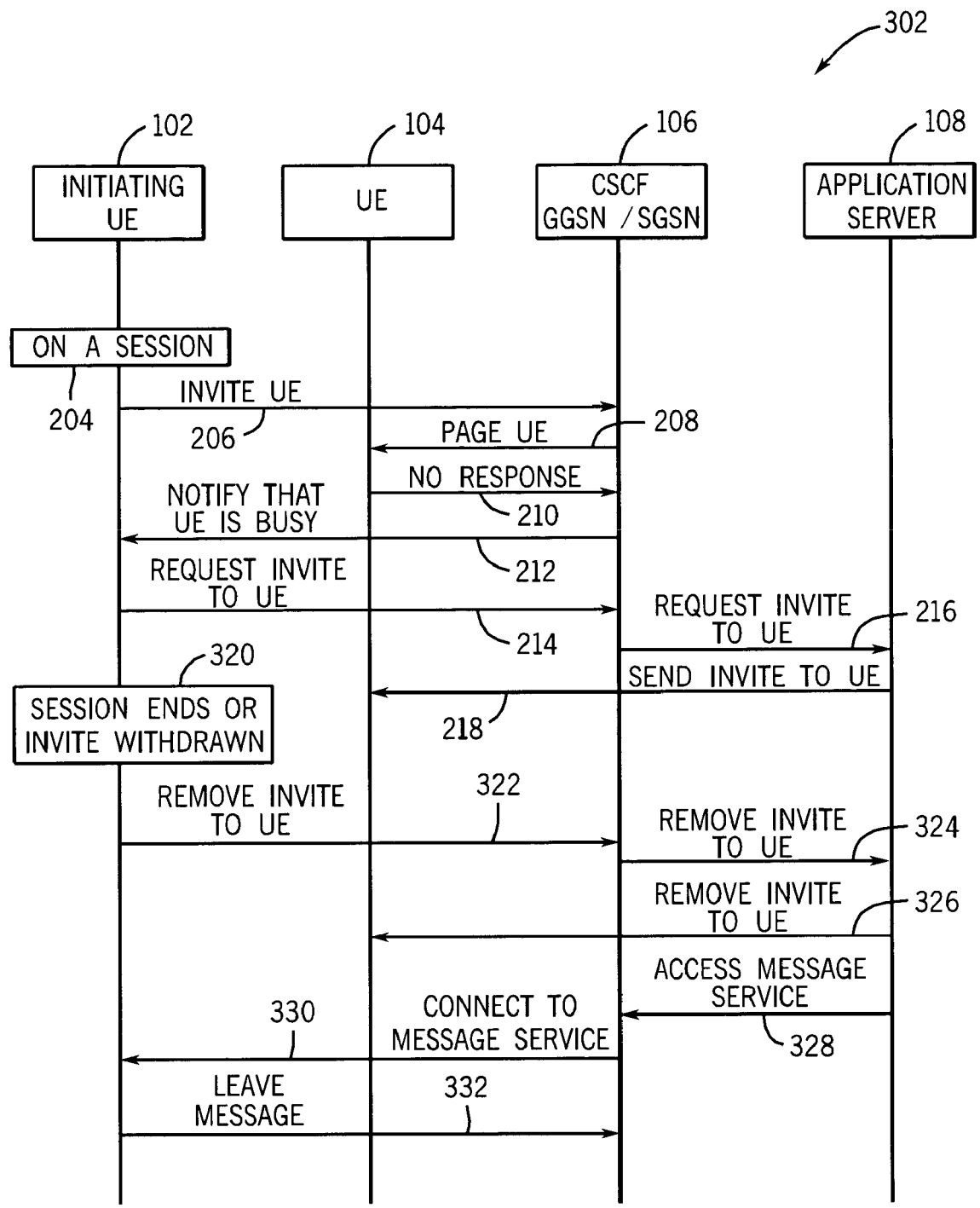
FIG. 3 is a representation of an exemplary implementation of a message flow illustrating an employment of invitations, withdrawals and completions of a communication session by the application server component of FIG. 1.

Turning to FIGS. 1 and 3, the communication device 102 sends an invitation to the application server 108 for the user 112 of the communication device 104 to join the communication session 204 as described in the message flow 202. Message flow 302 represents an exemplary employment of invitations, withdrawals and completions of a communication session by the application server component 108. Upon receipt of the indicator of the invitation 218, the communication device 102 in one example reaches a completion of the communication session 320. In one example, "SESSION ENDS OR INVITE WITHDRAWN" serves to represent the completion of the communication session 320. For example, the action comprises the completion of the communication session 320. In another example, "SESSION ENDS OR INVITE WITHDRAWN" serves to represent a withdrawal 320 of the invitation by one or more of the communication devices 102 and 103. For example, the action comprises the withdrawal 320 of the invitation.

Upon the action of the communication device 104, the communication device 103 sends a withdrawal 322 of the invitation. "REMOVE INVITE TO UE" in one example serves to represent the withdrawal 322 of the invitation. Upon receipt of the withdrawal 322 of the invitation, the control component 106 send a withdrawal 324 of the invitation to the application server component 108. "REMOVE INVITE TO UE" in one example serves to represent the withdrawal 324 of the invitation. Upon receipt of the withdrawal, the application server component 108 sends a withdrawal 326 of the indicator to the communication device 104. For example, where the indicator comprises the icon, the application server component 108 removes the icon from the communication device 104. "REMOVE INVITE TO UE" in one example, serves to represent the withdrawal 326 of the indicator.

The application server component 108 in one example accesses the message service 328 of the communication device 104. "ACCESS MESSAGE SERVICE" in one example serves to represent the message service 328. Upon access to the message service 328, the control component 106 connects the communication device 103 to the message service 330. "CONNECT TO MESSAGE SERVICE" in one example serves to represent the message service 330. Upon connection to the message service 328, the communication device 102 sends a message 332 for the communication device 104 at the control component 106. "LEAVE MESSAGE" in one example serves to represent the message 332.

The apparatus 100 in one example employs one or more computer readable media. Examples of a computer-readable medium for the apparatus 100 comprise the recordable data storage medium 114 of the application server 108 and the communication devices 102, 103, and 104. For example, the computer-readable medium for the apparatus 100 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
receiving an indication of one or more first communication devices that are to receive one or more invitations to join a communication session with one or more second communication devices, wherein the one or more invitations comprise a photo and a short message service (SMS) message;
activating one or more indicators of the one or more invitations to join the communication session on the one or more first communication devices;
receiving an acceptance of at least one of the one or more invitations by at least one of the one or more first communication devices; and
connecting the at least one of the one or more first communication devices to the communication session.

2. The method of claim 1, wherein the step of receiving the acceptance of the at least one of the one or more invitations by the one or more of the one or more first communication devices comprises the steps of:
employing the at least one of the one or more indicators to initiate a connection to the communication session;
removing at least one of the one or more indicators from the at least one of the one or more first communication devices; and
notifying the one or more second communication devices of the acceptance of the at least one of the one or more invitations by the at least one of the one or more first communication devices.

3. The method of claim 1, wherein the step of connecting the at least one of the one or more first communication devices to the communication session comprises the steps of:
matching the one or more invitations with the acceptance of the at least one of the one or more invitations; and
indicating a call identification of the communication session to one or more control components to connect the at least one of the one or more first communication devices with the one or more second communication devices in the communication session.

4. The method of claim 1, wherein the at least one of the one or more invitations comprise one or more first invitations of the one or more invitations, the method further comprising the steps of:
   receiving a withdrawal of a second invitation of the one or more invitations prior to receipt by the application server component of an acceptance of the second invitation by a communication device of the one or more first communication devices;
   removing an indicator of the one or more indicators of the second invitation from the communication device; and
   sending a notification of the withdrawal to the one or more first communication device.

5. The method of claim 1, wherein the at least one of the one or more invitations comprise one or more first invitations of the one or more invitations, the method further comprising the steps of:
   identifying a completion of the communication session prior to receipt by the application server component of an acceptance of a second invitation by a communication device of the one or more first communication devices;
   removing an indicator of the one or more indicators of the second invitation from the communication device; and
   sending a notification of the completion of the communication session to the one or more first communication device.

6. The method of claim 1, wherein the at least one of the one or more invitations comprise one or more first invitations of the one or more invitations, the method further comprising the steps of:
   receiving a rejection of a second invitation of the one or more invitations by a communication device of the one or more first communication devices prior to receipt by the application server component of an acceptance of the second invitation; and
   notifying one or more of the one or more second communication devices of the rejection of the second invitation.

7. An apparatus, comprising:
   an application server component that receives an indication of one or more communication devices that are to receive one or more invitations to join a communication session;
   wherein the one or more invitations comprise a photo and a short message service (SMS) message; and
   wherein the application server component notifies the one or more communication devices of the one or more invitations to join the communication session; and
   wherein upon acceptance of at least one of the one or more invitations by at least one of the one or more communication devices, the application server component connects the at least one of the one or more communication devices to the communication session.

8. The apparatus of claim 7, wherein the one or more communication devices comprise one or more first communication devices; and
   wherein the application server component receives the indication of the one or more first communication devices from one or more second communication devices.

9. The apparatus of claim 8, wherein the one or more second communication devices are involved in the communication session; and
   wherein the application server component notifies the one or more first communication devices of the one or more invitations to join the communication session with the one or more second communication devices.

10. The apparatus of claim 9, wherein the application server component identifies a match between the one or more invitations and the acceptance of the at least one of the one or more invitations; and
    wherein the application server component employs the match to indicate to one or more control components a call identification of the communication session; and
    wherein the one or more control components employ the call identification to connect at least one of the one or more first communication devices to the one or more second communication devices in the communication session.

11. The apparatus of claim 8, wherein the one or more first communication devices comprise a communication device, and wherein the application server component activates an indicator of an invitation of the one or more invitations on the communication device, and wherein the indicator persists until an action occurs on the invitation.

12. The apparatus of claim 11, wherein the indicator persists on a display of the communication device, and wherein upon the acceptance of the invitation by the communication device, the user of the communication device employs the indicator to initiate a connection to the communication session; and
    wherein the application server component connects the communication device to the communication session.

13. The apparatus of claim 11, wherein the action comprises an acceptance of the invitation by the communication device; and
    wherein upon receipt of the acceptance of the invitation by the communication device, the application server component sends one or more notifications of the acceptance of the invitation by the communication device to the one or more second communication devices.

14. The apparatus of claim 11, wherein the action comprises a withdrawal of the invitation by at least one of the one or more second communication devices; and
    wherein prior to an acceptance of the invitation, the at least one of the one or more second communication devices send the withdrawal to the application server component.

15. The apparatus of claim 14, wherein upon receipt of the withdrawal, the application server component removes the indicator of the invitation from the communication device.

16. The apparatus of claim 11, wherein the action comprises a rejection of the invitation by the communication device; and
    wherein prior to an acceptance of the invitation, the communication device sends the rejection to the application server component.

17. The apparatus of claim 16, wherein upon receipt of the rejection, the application server component sends one or more notifications of the rejection to the one or more second communication devices.

18. The apparatus of claim 11, wherein the action comprises a completion of the communication session; and
    wherein upon completion of the communication session prior to an acceptance of the invitation, the application server component sends a notification to the communication device of the completion of the communication session; and
    wherein the application server component removes the indicator of the invitation from the communication device.

19. The apparatus of claim 11, wherein the indicator comprises an icon, a tone and a light.

20. The apparatus of claim 1, wherein the communication session comprises a voice conference call, and wherein upon acceptance of an invitation of the one or more invitations by a communication device of the one or more communication devices, the application server component connects a user of the communication device into a voice conversation with one or more participants in the communication session.

21. The apparatus of claim 7, wherein the communication session comprises a data session or a voice conference call.

22. The apparatus of claim 7, wherein the indication comprises a phone number, an email address or an instant message account name.

23. The apparatus of claim 7, wherein the one or more invitations comprise a phone call, the photo, and the short message service (SMS) message.

24. A computer-readable medium having computer executable instructions for performing steps, comprising:

means in the one or more media for receiving an indication of one or more first communication devices that are to receive one or more invitations to join a communication session with one or more second communication devices, wherein the one or more invitations comprise a photo and a short message service (SMS) message;

means in the one or more media for activating one or more indicators of the one or more invitations to join the communication session on the one or more first communication devices;

means in the one or more media for receiving an acceptance of at least one of the one or more invitations by at least one of the one or more first communication devices; and means in the one or more media for connecting the at least one of the one or more first communication devices to the communication session.

\* \* \* \* \*